S. B. ARTZ.
MARKER FOR CORN PLANTERS.
APPLICATION FILED JULY 15, 1910.
976,771.
Patented Nov. 22, 1910.
2 SHEETS—SHEET 1.
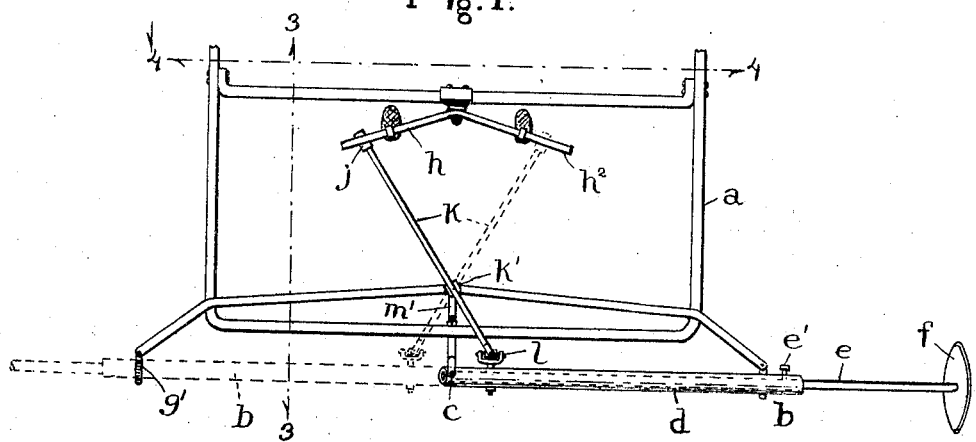
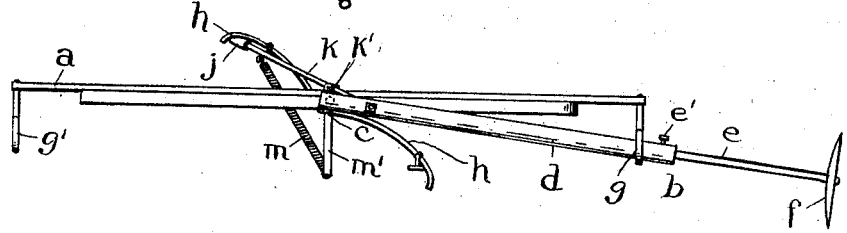
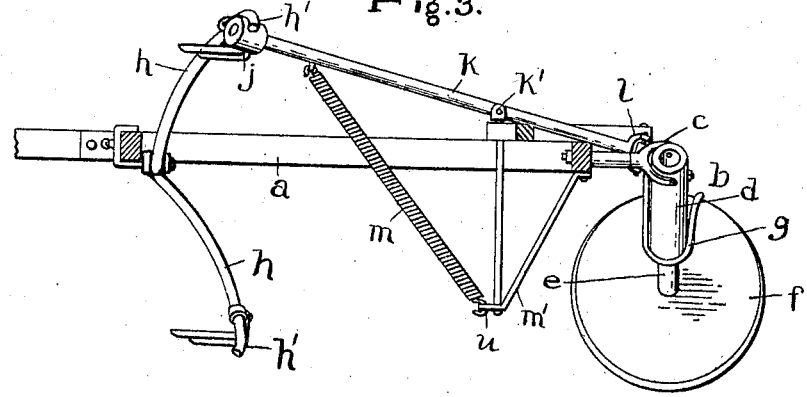
Witnesses
Stuart Hilder.
Frances M. Anderson
Inventor
S. B. Artz
by
E. W. Anderson & Son
his Attorneys S. B. ARTZ.
MARKER FOR CORN PLANTERS.
APPLICATION FILED JULY 15, 1910.
976,771.
Patented Nov. 22, 1910.
2 SHEETS—SHEET 2.
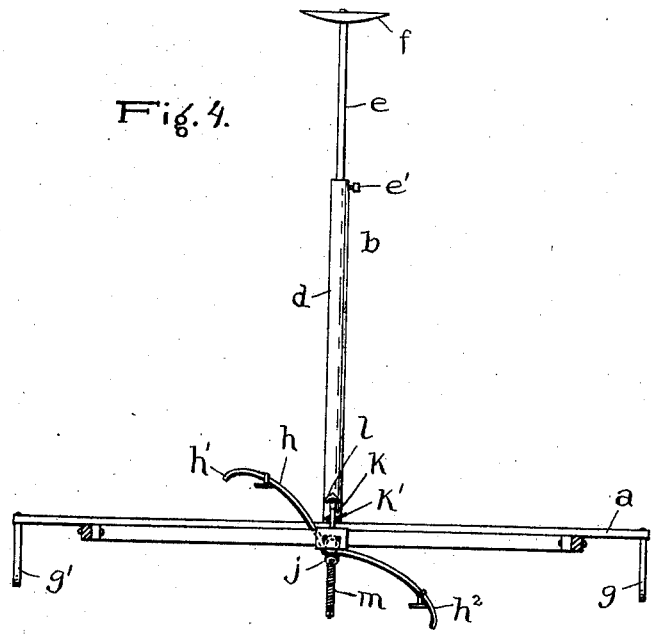
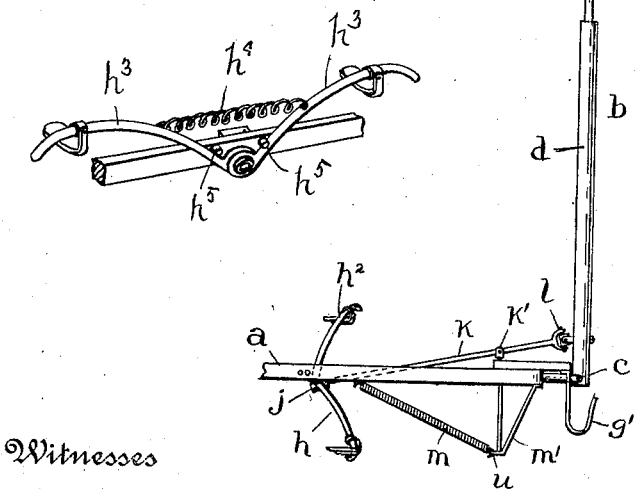
Witnesses
Stuart Hilder.
Frances M. Anderson.
Inventor
S. B. Artz
by E. W. Anderson & Son
his Attorneys

UNITED STATES PATENT OFFICE.

SCARFF BERNARD ARTZ, OF OSBORN, OHIO.

MARKER FOR CORN-PLANTERS.

976,771.     Specification of Letters Patent.     Patented Nov. 22, 1910.

Application filed July 15, 1910. Serial No. 572,199.

*To all whom it may concern:*

Be it known that I, SCARFF BERNARD ARTZ, a citizen of the United States, resident of Osborn, in the county of Greene and State of Ohio, have made a certain new and useful Invention in Markers for Corn-Planters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention with the reversed position of the marker shown in dotted lines. Fig. 2 is a rear view of the invention. Fig. 3 is a section on the line 3—3, Fig. 1. Fig. 4 is a section on the line 4—4, Fig. 1, showing the marker as in the midway or vertical position assumed in being carried over from one side of the machine to the other. Fig. 5 is a side view of the invention with the marker in midway or vertical position. Fig. 6 is a detail perspective view of a modified form of foot lever.

The invention has relation to markers for corn planters, having for its object to provide improved means for bringing the marker under the control of the feet for reversing the marking disk from one side of the machine to the other, leaving the hands of the operator or driver free to turn the team at the end of the line or field.

The invention consists in the novel construction and combinations of parts as hereinafter set forth.

In the accompanying drawings, illustrating the invention, the letter $a$, designates the supporting frame of the corn planter, the marker pole $b$, having a swivel connection with said frame at its inner end at $c$, said pole being composed of a main inner portion or tube $d$, and an outer portion or rod $e$, carrying the marker disk $f$, at its outer end and having an extensible engagement with said tube, a set screw $e'$, being provided to fix the adjustment.

The marker pole has a slight downward inclination from its inner to its outer end and is supported or hung intermediately of its length in an open hook $g$, of the frame. This pole is designed to be swung upon the swivel connection $c$, as a center through a little more than an arc of 180 degrees, or a half-circle, in order that the marking disk thereof may occupy an operative or marking position at the opposite side of the machine when the team is turned at the end of the line, a similar open supporting hook $g'$, at the opposite side of the machine receiving the marker pole as it descends.

In order to swing the marker pole and its disk over to a position at the opposite side of the machine I provide a depressible foot lever $h$, having a forward and downward curvature from its upper free end, which is bent somewhat downward at $h'$, and engages beneath the same an anti-friction roller bearing $j$, located at the forward free end of a lever $k$, said lever having a downward and oblique or lateral extension from its forward to its rear end, being fulcrumed intermediately of its length to the frame at $k'$, and at its rear end having a swivel connection $l$, with the marker pole at one side of the swivel connection of marker pole and frame. A strong coil spring $m$, has connection at one end with said lever in rear of its forward free end, and at its other end said spring has connection with a downward extending bracket $m'$, of the frame at $u$. In this way upon depression of the pedal lever $h$, to a position shown in Fig. 4 of the drawings, the forward free end of the lever $k$, will be also depressed and at the same time caused to move laterally and toward the center of the machine until the anti-friction roller bearing occupies a position at the center of the machine at the inner extremity of the pedal lever, the marker pole and its disk being at the same time raised upon its swivel connection with the frame as a center until it occupies an upright position, extending vertically upward from said fulcrum connection. A slight further depression of the pedal lever, or it may be the momentum of the marker itself, will carry it past the center and cause it to descend upon the opposite side of the machine against the tension of the coil spring $m$, whereby the descent is made easily and without shock, the marker pole being received in the open hook support at this side of the machine, said hook support limiting the descent and causing the marker disk to assume a proper position with relation to the frame for its operation. The raising of the marker is assisted by the action of the coil spring, which is put under tension when the marker descends and acts in the nature of a balance, the raising of the marker being thereby accomplished with a slight exertion of force upon the pedal lever and the fall of the marker being made without shock or strain upon the parts. In the fall of the marker the anti-friction roller bearing at the forward end of the lever $k$, will move upwardly and laterally with the lever, rolling along the lower surface of a duplicate pedal lever $h'$, at the opposite side of the machine until it occupies a position with relation thereto similar to the position it has previously occupied with relation to the pedal lever $h$, ready for a new operation of the marker when it is required to be operated reversely to resume its first position.

In Fig. 6 of the drawings the foot lever is shown as made in two parts $h^3$, $h^3$, a spring $h^4$ connecting these parts and serving to hold the same in normal raised position. Stops $h^5$, $h^5$, serve to limit the upward movement of the parts of the lever.

Having thus described my invention, what I claim as new and desire to secure by Letters Patent is:

1. In a marker for corn planters, a supporting frame, a marker pole having a pivotal connection with said frame and a marktion with the frame and with said operating connection between one of said foot levers and said pole to swing said pole and its marking device over to the opposite side of the machine into engagement with the other foot lever, and spring means having connection with the frame and with said operating connection, normally under tension, to assist in raising the marker pole and adapted to be automatically put under tension upon the fall of the marker pole to cushion such fall.

2. In a marker for corn planters, a supporting frame, a marker pole having a pivotal connection with said frame and a marking device, double foot levers and an operating connection between one of said foot levers and said pole, having movement as a whole vertically and laterally to swing said pole and its marking device over to the opposite side of the machine into engagement with the other foot lever.

3. In a marker for corn planters, a supporting frame, a marker pole having a pivotal connection with said frame and a marking device, double foot levers and an operating connection between one of said foot levers and said pole, having movement as a whole vertically and laterally to swing said pole and its marking device over to the opposite side of the machine into engagement with the other foot lever, and spring means having connection with the frame and with said operating connection to assist in raising the marker pole and to cushion the fall thereof.

4. In a marker for corn planters, a supporting frame, a marker pole having at its inner end a swivel connection with said frame and at its outer end a marker disk, double foot levers, means whereby upon operation of said foot lever the marker pole and disk may be swung over upon said fulcrum connection into operative position at the opposite side of the machine, including a laterally and vertically working connecting lever having at one end thereof an anti-friction bearing engagement with one of said foot levers and at its opposite end a swivel connection with the marker pole, a supporting hook at each side of the machine for the marker pole, and a coiled spring having at one end attachment to said connecting lever and at its opposite end attachment to said frame to assist in raising the marker pole and to cushion the fall thereof.

In testimony whereof I affix my signature, in presence of two witnesses.

SCARFF BERNARD ARTZ.

Witnesses:
 LEVI TIPPY,
 MORRIS D. RICE.